July 18, 1950 | M. G. KAUFMAN | 2,515,452

PULSE SIGNALING SYSTEM

Filed May 6, 1947 | 4 Sheets-Sheet 1

Inventor

Maxime G. Kaufman

Inventor

Maxime G. Kaufman

July 18, 1950 M. G. KAUFMAN 2,515,452

PULSE SIGNALING SYSTEM

Filed May 6, 1947 4 Sheets-Sheet 3

Inventor

Maxime G. Kaufman

Inventor

Maxime G. Kaufman

Patented July 18, 1950

2,515,452

UNITED STATES PATENT OFFICE 2,515,452

PULSE SIGNALING SYSTEM

Maxime G. Kaufman, Washington, D. C.

Application May 6, 1947, Serial No. 746,274

11 Claims. (Cl. 250—9)

This invention appertains to a new system of pulsed radio energy communications and has several objects and advantages in operating as a single or multi-channel system, all in a manner to greatly simplify the circuitry involved.

With these and other objects and advantages of equal importance in view, the invention resides in the certain new and useful combination and arrangement of electronic circuits, as will be hereinafter more fully described, set forth in the appended claims, and illustrated in the accompanying drawings.

This invention may be established as a pulse rise and fall-time modulation type. As the name implies, the system is based on the fact that either the leading or the trailing edge, or both, of a pulse may be made to vary in accordance to one or more modulating signals.

The system described herein shows theoretically and practically how this may be done in such a manner as to yield unusual linearity and low distortion which enables the method to be reduced to practice. The description also includes the technical consideration of the receiving as well as the transmitting system.

Among the several objects of my invention are:

1. To provide means for a new multi-channel pulse communication system.
2. To provide means for a practically noiseless pulse communication system.
3. To provide means for pulse communications of constant energy for security purposes.
4. To provide means for two channel communications without a synchronized signal, thus allowing for simpler overall circuitry and more reliable operation.
5. To provide means for a pulse modulated transmitter to have output pulses whose radio frequency energy may be frequency modulated.

This pulse system has many advantages over prior art in the following respects:

1. Multi-plexing on one set of pulses and one carrier without time-division methods.
2. Practically noiseless outputs at the receiver.
3. System cannot "fall out" of synchronism.
4. Extremely flexible in pulse-repetition-rate versus modulation frequency ratio, allowing for a third intelligence signal to be carried on said pulse-repetition-rate variations.
6. Provides unique means which may be used for frequency modulating individual pulses of radio energy.
7. System involves new circuits and establishes linear relationship between the carrier-energy and the modulating signal energy.

A complete description of the invention follows in conjunction with drawings wherein.

Referring to the drawings, wherein like characters of reference denote corresponding parts in several views, the embodiment of the invention, as it is exemplified therein, is generally comprised of electronic circuits.

Figure 1:
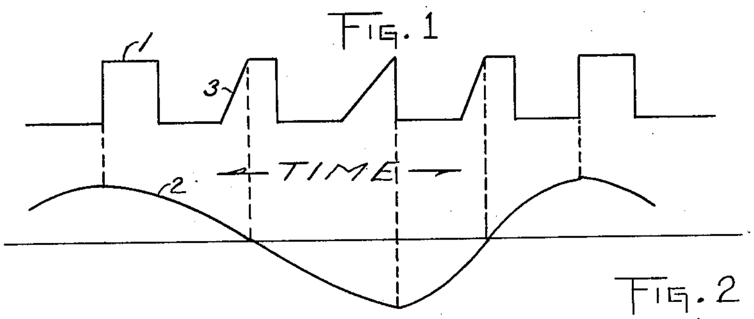
Fig. 1 illustrates, by way of example only, how a series of pulses are modulated by an intelligence signal.
Figure 2:
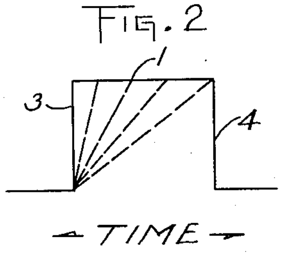
Fig. 2 shows, as an example, how any one pulse may have various per cent modulation.

With reference to Fig. 1 there is shown a series of pulses 1 which have different rise-times of their leading edge 3 for a given amplitude. This varying rise-time is imparted to the pulses by the modulating waveform 2 by means of circuitry to be described herein. Figure 2 shows a single pulse 1 with several possible rise-times 3 shown dotted. Here again holding the pulse 1 amplitude and fall-time 4 constant.

Figure 3:
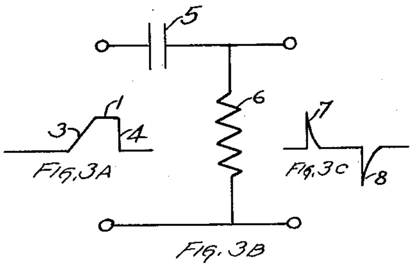
Fig. 3 shows as an example, the output waveform when a pulse of the type shown is impressed on the circuit shown.
Figure 5:
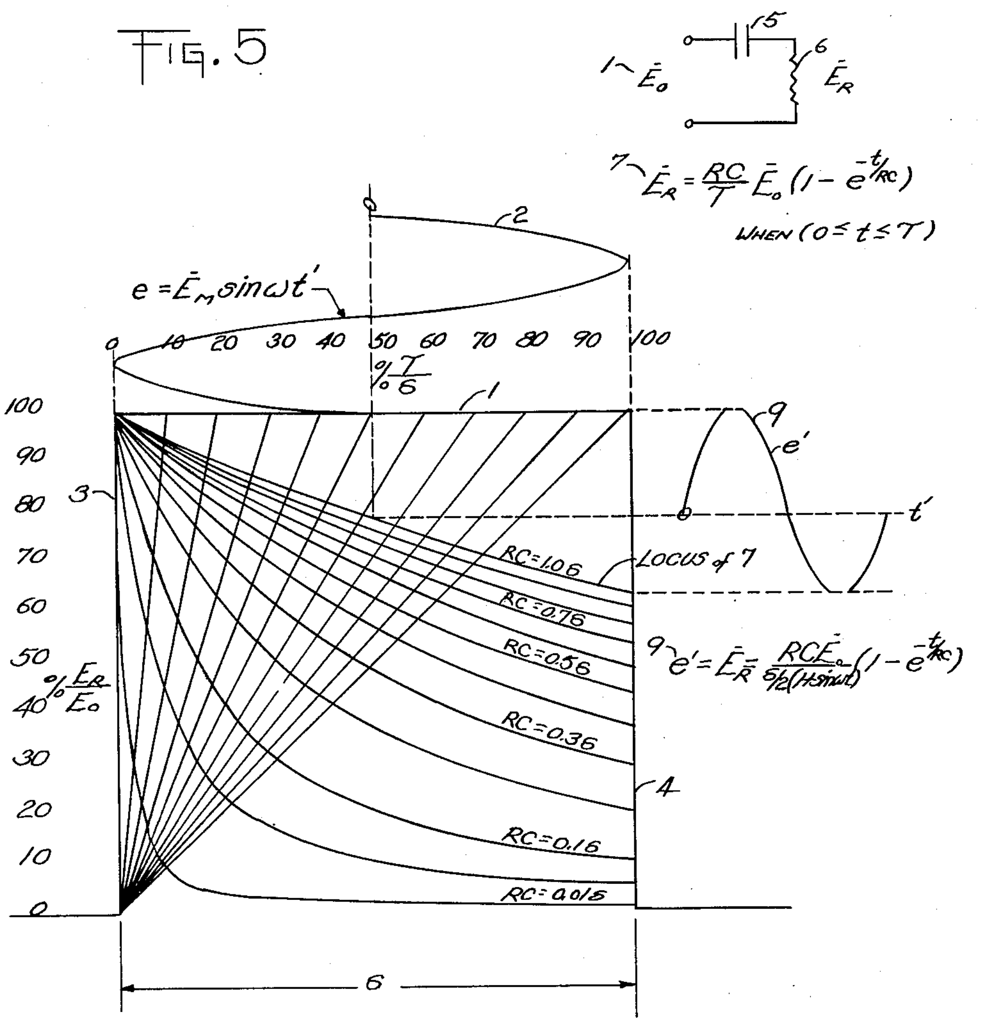
Fig. 5 shows as an example, how the principles involved can be expressed analytically.

The discussion so far has shown in the pulses as they may appear when transmitted and received. Now with reference to the circuit of Fig. 3B having a pulse 1, Fig. 3A, impressed on it, said circuit will produce a waveform as shown in Fig. 3C, providing the resistor and condenser combination have a short time constant with respect to the time duration of the pulse 1. Portions 7 and 8 of Fig. 3C have peak amplitudes proportional to the rise-time 3 and the fall-time 4 of the pulse 1 shown in Fig. 3A. Therefore, it is evident that if several pulses in succession are impressed on the circuit of Fig. 3B that the peaks 7 and 8 of the output waveform may be made to vary proportional to a modulating voltage as shown in Fig. 1.

Thus it is shown how demodulation of this pulse system is had. It has been shown herein how two signals can be carried simultaneously, by modulating both the rise and fall time of the pulses, also it will be shown how a third signal can be carried, by varying the repetition-rate.

In this system of pulsed radio energy communications the overall description must include the receiving as well as the transmitting theory. Therefore, in the following explanations, it has been convenient to superimpose the functions of transmitting and receiving upon the same drawings and graphs, so as to better depict the overall action thereof.

It is not the intention of this invention to limit this explanation to the action of the leading edge of the pulse; however, since the action is similar it will be limited in general to the leading-edge of the pulse. With this in mind, it is readily seen, that said pulse can carry two sets of intelligence at the same time.

The discussion that follows will explain how pulses of different rise or fall time can be transmitted and received so as to convey intelligence. The first part will explain the pulses before and after transmitting, the next deals with the demodulating process at the receiver.

With reference to Fig. 3B the expression for the voltage across the resistor, with an input voltage of constant slope, is obtained by the solution of the linear differential equation of the circuit. This gives: (Equation 1)

$$E_R=\frac{RCE_0}{\tau}\left(1-e^{-t/RC}\right)$$

Where:

(See calculations below)

$E_0$=input voltage of constant slope
$E_R$=voltage across the resistance
$\tau$=rise-time in seconds
$t$=time in seconds
R=resistance in ohms
C=capacity in farads $$Ri+Q/C=\frac{E_0\cdot t}{\tau} \qquad Q=\int idt$$

$$R\frac{dQ}{dt}+Q/C=\frac{E_0t}{\tau}$$

$$\frac{dQ}{dt}+\frac{1}{RC}Q=\frac{E_0\cdot t}{\tau R}$$

$$e^{\int\frac{dt}{RC}}dQ+\frac{Q}{RC}e^{\int dt/RC}dt=\frac{E_0t}{\tau R}e^{\int\frac{dt}{RC}}dt$$

$$Qe^{t/RC}=\frac{E_0}{\tau R}\int te^{t/RC}dt+A$$

$$Q=\frac{E_0e^{-t/RC}}{\tau R}\int te^{t/RC}dt+Ae^{-t/RC}$$

$$\int te^{t/RC}dt \qquad \int udv=uv-\int vdu$$

$$\begin{Bmatrix} dv=e^{t/RC}dt & u=t \\ v=RCe^{t/RC} & du=dt \end{Bmatrix}$$

$$\therefore\int te^{t/RC}dt=RCte^{t/RC}-\int RCe^{t/RC}dt$$

$$=RCte^{t/RC}-R^2C^2e^{t/RC}$$

$$=RCe^{t/RC}(t-RC)$$

Calculations:

$$\therefore Q=\frac{E_0e^{-t/RC}}{\tau R}\left\{RCe^{-t/RC}(t-RC)\right\}+Ae^{-t/RC}$$

$$Q=\frac{CE_0}{\tau}(t-RC)+Ae^{-t/RC}[t=o,\ Q=o]$$

$$O=\frac{-C^2RE_0}{\tau}+A$$

$$A=\frac{C^2RE_0}{\tau}$$

$$Q=\frac{CE_0}{\tau}(t-RC)+\frac{C^2RE_0}{\tau}e^{-t/RC}$$

$$Q=\frac{CE_0}{\tau}\left(t-RC+RCe^{-t/RC}\right)$$

$$Q=\frac{CE_0}{\tau}\left[t+RC\left(e-1^{-t/RC}\right)\right]$$

$$i=\frac{dQ}{dt}=\frac{CE_0}{\tau}\left[1+RC\left(-\frac{1}{RC}e^{-t/RC}\right)\right]$$

$$i=\frac{CE_0}{\tau}\left(1-e^{-t/RC}\right)$$

(Equation 1)

$$E_R=Ri=\frac{CRE_0}{\tau}\left(1-e^{-t/RC}\right)$$

$$E_R \text{ for } 0\leq t\leq\tau$$

(Equation 1)

$$E_R=E_\tau e^{-\left(\frac{t-\tau}{RC}\right)} \quad \tau\leq t\leq\alpha$$

With reference to Fig. 4A there is shown a sample pulse 1 with several possible rise-times 3, shown dotted. Immediately above in Fig. 4B is shown the waveform of $E_R$ for each of the rise-times. Now, if the peaks of $E_R$ are all joined together, they form a locus, and it represents the value of $E_R$ for all possible rise-times of the pulse 1 shown in Fig. 4B. The equation shown above is the value of $E_R$ at any time during the rise-time 3 of the pulse 1. The voltage across the resistor 6 of Fig. 3B after the pulse 1 has reached its final amplitude is the voltage of the discharging condenser, and can be shown to be:

(Equation 2)

$$e_R=\gamma E_\tau e^{-\left(\frac{t-\tau}{RC}\right)}$$

Figure 4:
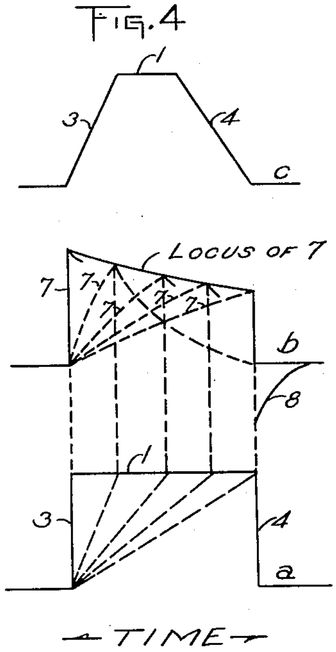
Fig. 4A and 4B shows graphically, as an example, how the locus of peaks varies for the output waveform of Fig. 3.
Fig. 4C shows as an example, a pulse with both its rise and fall time modulated.

Normally voltage waveforms 8 shown dotted on Fig. 4B would be present due to the fall-time 4 change of voltage of the pulse and the action just described for the rise-time is exactly duplicated, except that the potentials are negative with respect to the former. The locus of waveforms 8 have been omitted for the sake of clarity in this Fig. 4. Fig. 4A and Fig. 4B are used herein to explain the construction of Fig. 6.

Figure 6:
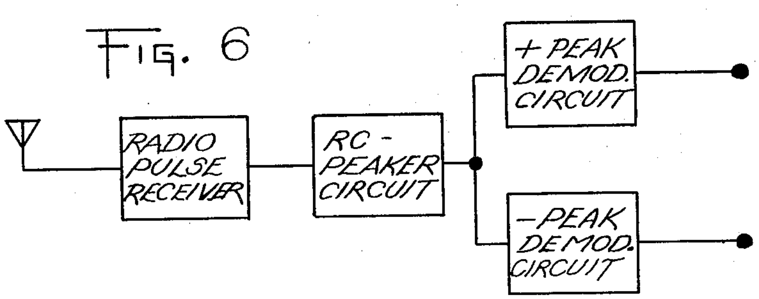
Fig. 6 shows as an example, a block-diagram of the receiving end of the system.

Referring to Fig. 6 which shows Fig. 4A and Fig. 4B superimposed and the action of the modulating voltage 2 on the pulse 1 shown in heavy lines, all of which is drawn on a per cent basis. The modulating voltage is shown as sinusoidal but could be any function of time.

The resulting output voltage 9 is shown at the right of pulse 1, this has been projected from a condition where the R. C. time-constant of the circuit of Fig. 3B was equal to the time duration of the pulse $\delta$, that is, using the locus of 7 as marked RC=1.0$\delta$. Various loci 7 are shown since the system is not limited to the operation of any fixed combination. This output voltage 9 is that voltage that is obtained when all the peaks 7 of voltage waveforms developed across the resistor 6 in Fig. 3B are rectified through a detector circuit. By optimum choice of R. C. time-constant and the adjusting of the initial quiescent potentials on the modulating circuits, very good linearity of reproduction can be obtained. The dotted line rise-time of pulse 1 of Fig. 6 represents the initial or non-modulated pulse condition, this allows for a 50 per cent swing of the rise-time each side of said position. The equation for the output voltage 9, is:

(Equation 3) (where $\delta$=pulse width)

$$\acute{e}=E_R=\frac{RCE_0}{\delta/2(1+\sin\omega t)}\left(1-e^{-t/RC}\right)$$

A study of the time element shows that normally many pulses will occur during one cycle of the modulating voltage 2.

The fall-time 8 of the pulse 1 will give identical results as depicted in Fig. 6 and will also appear at the receiver in reverse polarity, from there it is channeled to a separate output.

The pulse repetition rate of this system can be quite variable without any detrimental effects, the larger multiple it is of the modulating frequency the better the reproduction will be. A variable pulse repetition rate may be used cryptically to provide security measures or to carry another channel of information simultaneously with the rise and fall time modulations of the pulses.

The pulse repetition frequency security method can be altered or supplemented with a constant energy type of transmission, namely, by having the pulses' leading and trailing edges inversely modulated. Thus affording protection against energy-type-detectors.

The previous discussion has demonstrated by theory and illustration how three channels of information can be communicated simultaneously, namely: (1) Rise-time modulation (2) Fall-time modulation (3) Pulse repetition modulation. The system does not require the burden of synchronizing circuits and will not "fall-out" if one or more pulses are missed or obliterated in any way. However the system will lend itself quite satisfactorily to synchronizing practices.

The system can be easily adapted to multiplexing by time-division to handle many channels, twice as many as in previous systems, since each pulse carries on itself two channels of information.

The signal to noise ratio is quite high in this system. The time duration of a single pulse (several micro-seconds) is such as to be a very small per cent of the total time, this is advantageous, especially when the noise can be eliminated during the time when pulses are not present. This is done readily by means of clipping circuits.

The system has noise reducing characteristics inherent in itself, namely; the bandwidth of the radio receiver can be made less than for the usual steep-sided pulse reception type systems. This limits the high-frequency noise response. Also the R. C. time-constant of Fig. 3B used for demodulation has a definite low-band attenuation characteristic. The overall result is an adjustable band-pass system which reduces the total noise output.

Since some transmitting tubes are frequency-sensitive versus applied voltage, this rise-time (or fall-time) pulse can be used to vary the rate of frequency shifting.

A detailed description of the circuitry involved in accomplishing the action of the system will now be given. Refer to Fig. 6 which represents one version of a workable receiver circuit. This drawing has been set up in block-diagram form for clarity and the circuitry of said blocks will be fully explained where the titles are not self-evident as to the electronic principle they represent.

In the upper left hand corner is the receiver proper consisting of the necessary electronic circuit elements for receiving an R. F. pulse and demodulating the same into a video-pulse. This receiver incorporationg the usual AVC networks and tuning controls for optimum performance.

At the right of the receiver block is the R-C Peaker circuit. This circuit in its simplist form consists of a condenser and resistor in series, the time-constant of which is small compared to the width time of the pulse. The theory of detection of this circuit has been explained. This block contains various combinations of the R. C. time-constants so that an optimum choice can be selected for detection. This circuit also consists of a detector that converts the differentiated pulses to the intelligence voltage that they carry and it also incorporates filters to reject the pulse-repetition-rate energy.

Figure 7:
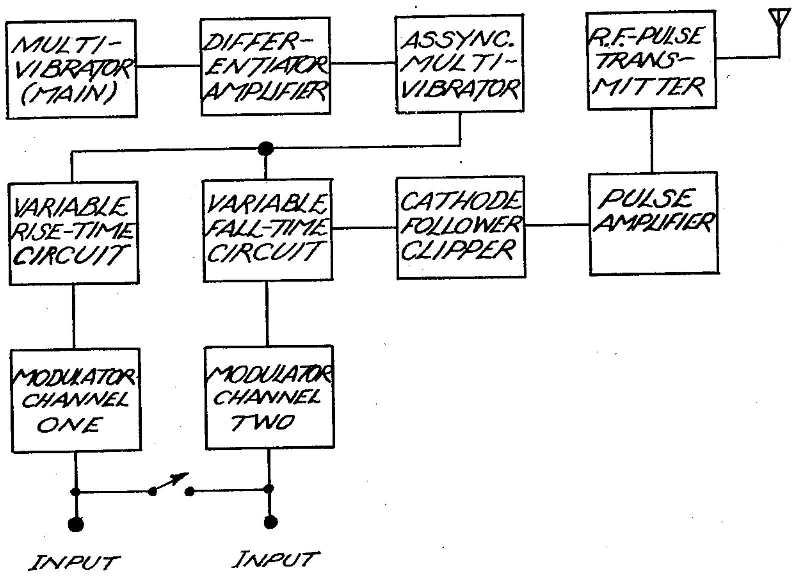
Fig. 7 shows as an example, a block-diagram of the transmitting end of the system.

The block-diagram of Fig. 7 illustrates the function of a workable version of the transmitter. The circuits involved have a two fold purpose. (1) To vary the rise-time of the pulses, (2) To vary the fall-time of the pulses, (3) To vary the rise and fall time of the pulses inversely by an intelligence voltage in such a way as to transmit energy at a constant level.

The description begins with the multi-vibrator which in one case is free running at a rate that allows sufficient sampling rate of the modulating voltages. These pulses are differentiated and amplified and used to trigger the asynchronous multi-vibrator of pre-set pulse width output. These pulses are fed simultaneously to the variable rise-time and fall-time circuits, as shown, and on through a cathode-follower, an amplifier-buffer, and finally to the radio-frequency generator marked "transmitter." The blocks marked modulator #1 and #2 are used to vary the rise and fall time of said pulses proportional to the respective signal inputs to said modulators. It can be seen by closing the switch between the channels #1 and #2 on Fig. 7 and with reference to Fig. 8, the circuit, that when one modulating intelligence voltage is applied to either input, that the rise and fall time of the pulses will both be affected, with the result that the transmitted system output will be pulses of constant energy; since, for example: a fast rise time leading edge would be accompanied by a slow fall time and vice-versa. The proper phasing for this action can be obtained by poling correctly either input transformer of channels #1 and #2.

A breakdown of the essentially new circuitry of the blocks in Fig. 7 follows:

The main multi-vibrator is a conventional circuit. The modulator channels 1 and 2 are signal amplifiers and limiter circuits to prevent over-modulation. The block marked pulse amplifier ahead of the transmitter is a buffer stage.

Figure 8:
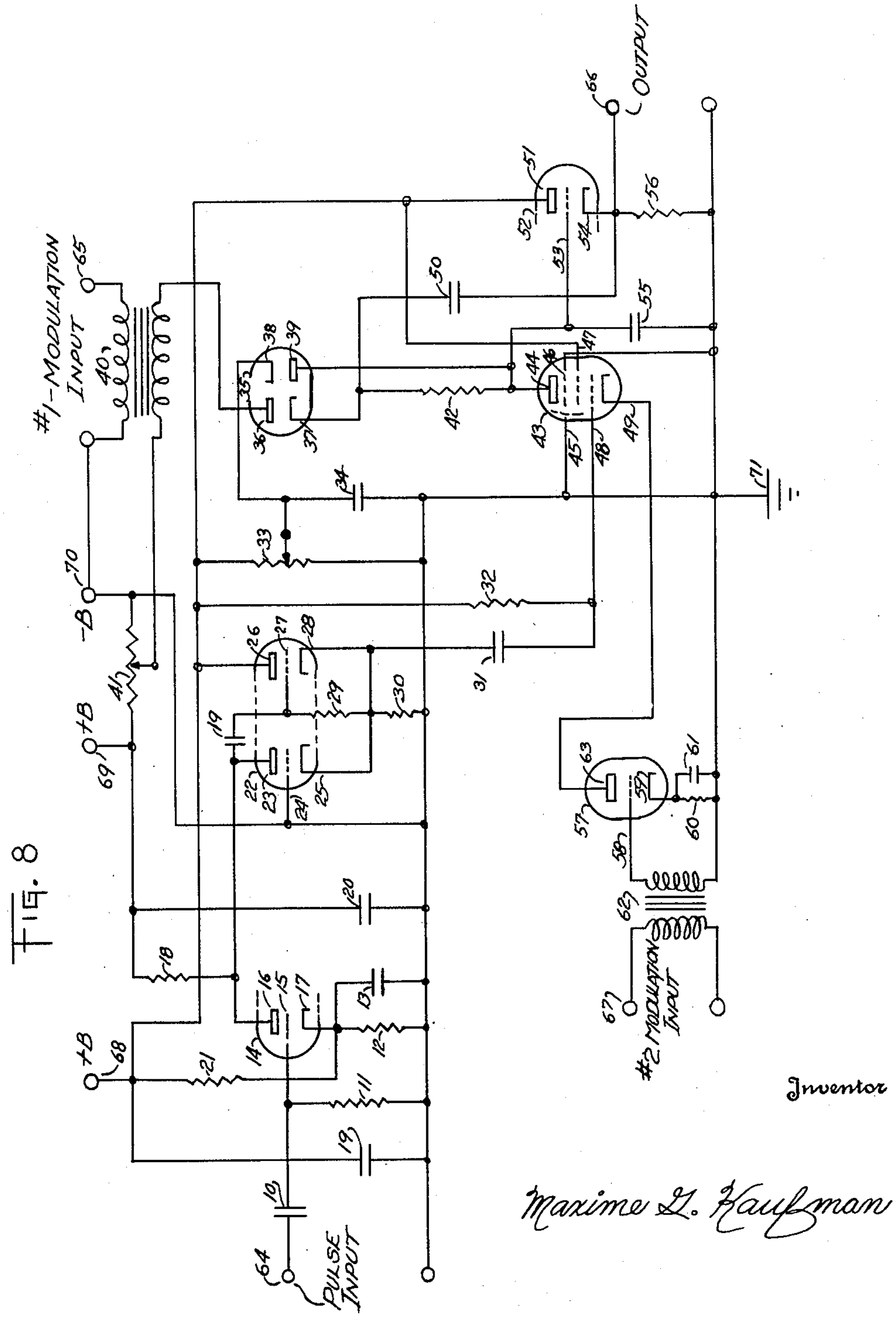
Fig. 8 shows as an example, the schematic circuit of a workable pulse modulator.

The remaining blocks will now be explained with the aid of Figure 8 which incorporates the following blocks of Fig. 7, the "differentiator and amplifier," the "asynchronous multi-vibrator," the "variable rise-time generator," the "variable fall-time generator," the "cathode follower." The action is as follows:

The output of the main multi-vibrator is fed to terminal 64 where it is differentiated by C10 and R11. At this point the waveform is fed to grid 15 of tube 14. Tube 14 is normally cut off due to bleeder action of R21 and R12 acting on cathode 17. The waveform so applied to grid 15 causes the tube 14 to draw current and allows a change of voltage across R18 which in turn upsets the asynchronous multi-vibrator circuit using tube 22. The C19 and R29 tend to establish the time-constant of the circuit of said tube 22 and a pulse voltage will appear across R30 common to cathode 25 and 28 of tube 22. This pulse is fed to the grid 48 of tube 43 through C31. The conducting tube 43 is caused to cut-off during the pulse duration; thus allowing C55 to charge through the elements 36 and 37 of the diode 35. This charging current develops a saw-toothed waveform across R42 and is fed to tube 52 on its grid 53. This tube 52 is connected as a cathode-follower and its output is across the cathode 54 resistor R56 which terminates at terminal 66.

The saw-tooth from the cathode-follower tube 52 at terminal 66 is of a linear-rise type and is so adjusted by the proper settings of the variable R41 and R33. The action of C50 provides for linearity of waveform and causes the total rise-time of the saw-tooth to cease at a pre-determined level by biasing off the current-feeding elements 36 and 37 of diode 35. Variable resistor 41 is used to set up the initial rise-time for the pulse by varying the quiescent plate voltage to elements 36 and 37 of diode 35. Variable resistor 33 is used in conjunction with elements 38 and 39 of diode 35, to clip the saw-tooth waveform being generated across resistor 42 so as to eliminate all but the most linear portion of said waveform.

Now the input transformer 40 is used to feed the modulating voltage from channel-1 to the variable rise-time circuit and thus it performs the function of varying the voltage on the plate 36 of diode 35, the net result is a series of pulses having rise-times proportional to said modulating voltage at channel-1.

The action followed through from channel-2 is such that a varying modulation voltage at terminal 67 causes the impedance of the tube 57 to vary. This tube is in series with resistor 42 and forms a voltage divider, therefore it is the impedance that the condenser 55 sees when it begins its discharge, which corresponds to fall-time of the pulse. Tube 43 is in series with tube 57. In this way by varying the impedance of tube 57 with modulating voltage of channel-2, the fall-time can be modulated simultaneously with the rise-time and at entirely different rates. It is at this point that it can be seen how the rise and fall time can be modulated inversely to keep the pulse energy constant, for security purposes.

The condensers 19 and 20 are filters for circuit stability. Terminals 68, 69, and 70 are the voltage feed points for this circuit. Other components not mentioned thus far are R60 and C61 which establish bias on tube 57. R32 is used to hold tube 43 at approximately zero-bias.

Having thus fully described my invention, it is to be understood that various changes in the design of the circuits and in minor details and arrangements of the circuits, may be resorted to, without departing from the spirit of the invention, or its scope as claimed.

What is claimed is:

1. In a pulse signaling system the method of transmitting pulses carrying intelligence comprising, the generation of pulses, varying the rate-of-rise of the leading edges of said pulses, modulating a transmitter with said so modified pulses and radiating said modified pulses from said transmitter.

2. A method of translating the intelligence from the rate-of-rise of the leading edges of the pulses in a pulsed carrier wave system into a waveform containing the intelligence comprising, translating the undulations of the pulse leading edges into narrow width pulses the amplitude of which is proportional to the corresponding undulations, and translating the narrow width pulses into a continuous waveform the amplitude of which is varying proportionally to the undulations of the said narrow width pulses.

3. In a pulse signaling system the method of transmitting pulses carrying intelligence comprising, the generation of pulses, varying the rate-of-fall of the trailing edges of said pulses in proportion to the intelligence to be conveyed by said pulses, modulating a transmitter with said so modified pulses, and radiating said modified pulses from said transmitter.

4. A method of translating the intelligence from the rate-of-fall of the trailing edges of the pulses in a pulsed carrier wave system into a waveform representing the intelligence comprising, translating the undulations of the pulse trailing edges into narrow width pulses the amplitude of which is proportional to the corresponding undulations, and translating the narrow width pulses into a continuous waveform the amplitude of which is varying proportionally to the undulations of the said narrow width pulses.

5. In a pulse signaling system the method of transmitting pulses carrying two intelligences comprising, the generation of pulses, varying the rate-of-rise of the leading edges of said pulses in proportion to the first intelligence to be conveyed by said pulses, varying the rate-of-fall of the trailing edges of said pulses in proportion to the second intelligence to be conveyed by said pulses, modulating a transmitter with said so modified pulses, and radiating said modified pulses from said transmitter.

6. A method of translating an intelligence from the rate-of-rise of the leading edges of the pulses in a pulsed carrier wave system, and simultaneously a method of translating another intelligence from the rate-of-fall of the trailing edges of the pulses in the said pulsed carrier wave system into two waveforms each representing the corresponding said intelligences comprising, translating the undulations of the pulses leading edges into narrow width pulses the amplitude of which is proportional to the corresponding undulations, translating the narrow width pulses into a continuous waveform the amplitude of which is varying proportionally to the undulations of the said narrow width pulses, and simultaneously, translating the undulations of the pulses trailing edges into narrow width pulses the amplitude of which is proportional to the corresponding undulations, and translating the narrow width pulses into a continuous waveform the amplitude of which is varying proportionally to the undulations of the said narrow width pulses.

7. In a multichannel pulse signaling system the method of transmitting pulses conveying a plurality of separate intelligences comprising, the generation of pulses, varying the rate-of-rise of the leading edges of said pulses in proportion to the first intelligence to be conveyed by said pulses, varying the rate-of-fall of the trailing edges of said pulses in proportion to a second intelligence to be conveyed by said pulses, varying the pulse repetition-rate of said pulses in proportion to a third intelligence to be conveyed by said pulses.

8. In a pulse signaling system the method of transmitting pulses at a constant energy level comprising, the generation of pulses, varying the rate-of-rise of the leading edges of said pulses in proportion to the intelligence to be conveyed by said pulses, varying the rate-of-fall of the trailing edges of said pulses inversely proportional to said intelligence, modulating a transmitter with said so modified pulses, and radiating said modified pulses from said transmitter.

9. In a pulse signaling system apparatus for the rate-of-rise of the leading edge of a pulse modulation of a transmitter comprising, the combination of a pulse generator connected to a differentiator-amplifier, said differentiator-amplifier being coupled with an asynchronous-muti-vibrator, said multivibrator being connected to a variable rate-of-rise pulse generator, said rate-of-rise generator connected to voltages proportional to the modulating signal voltage, output of said rate-of-rise pulse generator connected to a cathode-follower, an adjustable pulse clipper stage connected between said rate-of-rise pulse generator and said cathode follower, and a switch-tube connected to said clipper stage and a charging condenser connected to said switch tube.

10. In a pulse signaling system apparatus for rate-of-rise pulse modulation of a transmitter as in claim 9 characterized in this, provision for rate-of-fall of the trailing edge of a pulse modulation of said transmitter comprising the addition of a variable impedance in the discharge path of the switch-tube and condenser combination, said variable impedance being connected to a source of a second intelligence voltage.

11. In a pulse signaling system the apparatus for the rate-of-rise of the leading edge of a pulse demodulation and simultaneously independently rate-of-fall of the trailing edge of a pulse demodulation comprising the combination of a pulse receiver connected to a differentiator-circuit, said differentiator-circuit connected to two separate independent channels of rectifying circuits poled positive and negative respectively.

MAXIME G. KAUFMAN.

REFERENCES CITED

The following references are of record in the file of this patent:

UNITED STATES PATENTS

| Number | Name | Date |
|---|---|---|
| 2,199,179 | Koch | Apr. 30, 1940 |
| 2,383,126 | Hollingsworth | Aug. 21, 1945 |
| 2,406,790 | Beatty et al. | Sept. 3, 1946 |
| 2,419,292 | Shepard, Jr. | Apr. 22, 1947 |
| 2,419,547 | Grieg | Apr. 29, 1947 |
| 2,426,581 | Atkins | Sept. 2, 1947 |
| 2,428,010 | Chatterjea et al. | Sept. 30, 1947 |
| 2,430,139 | Peterson | Nov. 4, 1947 |
| 2,435,496 | Guanella et al. | Feb. 3, 1948 |
| 2,435,958 | Dean | Feb. 17, 1948 |